(12) United States Patent
McCann

(10) Patent No.: US 8,463,519 B2
(45) Date of Patent: Jun. 11, 2013

(54) TOWED EQUIPMENT BRAKE CONTROLLER

(75) Inventor: Michael J. McCann, Adrian, MI (US)

(73) Assignee: GRLC LLC, Madison Heights, MI (US)

( * ) Notice: Subject to any disclaimer, the term of this patent is extended or adjusted under 35 U.S.C. 154(b) by 612 days.

(21) Appl. No.: 12/594,462

(22) PCT Filed: Apr. 3, 2008

(86) PCT No.: PCT/US2008/004418
§ 371 (c)(1),
(2), (4) Date: Feb. 15, 2010

(87) PCT Pub. No.: WO2008/124073
PCT Pub. Date: Oct. 16, 2008

(65) Prior Publication Data
US 2010/0152920 A1 Jun. 17, 2010

Related U.S. Application Data

(60) Provisional application No. 60/909,910, filed on Apr. 3, 2007.

(51) Int. Cl.
G06G 7/00 (2006.01)
(52) U.S. Cl.
USPC ............ 701/70; 701/48; 303/123; 340/431; 280/428

(58) Field of Classification Search
USPC . 701/2, 48, 70, 71, 79, 83; 280/428; 303/123, 303/124, 20; 340/431, 453
See application file for complete search history.

(56) References Cited

U.S. PATENT DOCUMENTS

| | | | |
|---|---|---|---|
| 6,179,390 B1 * | 1/2001 | Guzorek et al. | 303/20 |
| 7,021,723 B1 * | 4/2006 | Kaufman | 303/20 |
| 8,010,252 B2 * | 8/2011 | Getman et al. | 701/70 |
| 8,060,288 B2 * | 11/2011 | Choby | 701/70 |
| 2006/0214506 A1 * | 9/2006 | Albright et al. | 303/123 |

* cited by examiner

Primary Examiner — Gerald McClain
(74) Attorney, Agent, or Firm — Novak Druce + Quigg LLP

(57) ABSTRACT

A brake controller (10) transmits a signal indicative of a braking force to electric brakes (126, 128) of towed equipment, such as a trailer or towed vehicle (120). The brake controller (10) can include at least one characteristic sensor (32), such as an accelerometer, reactive to a braking force applied by the driver of the towing vehicle (110) or to changes in attitude or orientation of the towed equipment. A microprocessor (140) acts upon a signal from the at least one characteristic sensor (32) to determine output settings used to activate the towed equipment braking system for application of sufficient braking force for desired slowing of the towed equipment in concert with the towing vehicle (110). Activation of braking systems of the towed equipment includes the use of wireless signals. Additionally, the use of the right-side brake and the left-side brake for sway control is disclosed.

9 Claims, 5 Drawing Sheets

TOWED EQUIPMENT BRAKE CONTROLLER

CROSS-REFERENCE TO RELATED APPLICATIONS

This application is a national stage entry of PCT/US2008/04418, which was filed on Apr. 3, 2008, and which claims priority to U.S. Provisional Patent No. 60/909,910, which was filed Apr. 3, 2007.

TECHNICAL FIELD

The present disclosure relates generally to a brake controller and devices communicating with the brake controller for adjustment of the braking system of towed equipment such as a towed trailer or a towed vehicle. More specifically the disclosure relates to signal exchange between a sensor associated with the towed equipment, and the brake controller in a towing vehicle.

BACKGROUND

A variety of methods are known for controlling braking systems of towed equipment such as trailers and towed vehicles. In many cases, braking of towed equipment occurs by activation of controllers located in the towing vehicle.

A known system uses electric brakes on the wheels of towed equipment such as utility trailers, boat trailers, and recreational vehicle trailers to provide needed stopping power. Electric brakes attached to a towed trailer, for example, typically use electric solenoids and/or magnets responsive to an electric brake controller mounted in the towing vehicle for activation from a position that is readily accessible to the driver.

If activated by a proportional controller, trailer brakes are generally electronically activated in response to the degree of slowing of the towing vehicle. Depending on the rate of deceleration, a brake controller sends a signal to apply the brakes of the trailer. The proportional controller can utilize a variety of different sensors to detect changes in inertia of the trailer and towing vehicle, force applied via the towing vehicle's brake system, or position of the brake pedal in the towed vehicle. An example of one type of proportional brake controller is presented in the disclosure of U.S. Pat. No. 7,058,499 to Kissel, which patent, is incorporated in its entirety herein by reference. If a time based controller is utilized instead of a proportional controller, the trailer brakes are generally electronically activated based on predefined power curve once the vehicle brakes are activated. The time based controller utilizes the same power curve every time the brake is actuated. Thus, it is independent from the towing vehicle's and/or the trailer's deceleration.

Popular types of trailer brake control devices include proportional controllers. Common sensing means for proportional controllers include a dynamic accelerometer in the form of a pendulum that measures the force of braking, or deceleration rate of the towing vehicle. In response to a change in these characteristics, the brake controller provides electrical power to apply proportional braking to the towed equipment. The pendulum senses force variation by the degree to which the pendulum swings from a default position. As pendulum displacement increases the proportional controller increases the force applied to the brakes.

Another function of the sensing means, represented by a dynamic accelerometer, is responding to variation of inclination of the towing vehicle. In other words, the sensing means reacts as the towing vehicle traverses an uphill or downhill grade. Whether measuring towing vehicle inclination or rate of deceleration, control signals passing from the accelerometer sensing means to the brake controller produce a proportionate brake amperage output signal with supply of electrical power to control the braking force applied to the brakes of the towed equipment. As expected, the brake amperage output signal increases for downhill grades and is minimal when the vehicle negotiates uphill grades.

Installation of trailer brake controllers typically requires wiring for electrical connection to the power source of the towing vehicle, to the brake lights of the towing vehicle and to the brakes of the towed trailer or vehicle. Often, wire connections used to carry power from the battery to the controller and amplified power from the controller to the brakes are arranged such the wire is of a heavier gauge wire than other wires used with the system. Other wires provide connection to ground—the ground wire usually being the same size as the above mentioned wires—and to brake lights in the controller circuit.

BRIEF DESCRIPTION OF THE DRAWINGS

The present disclosure will now be described in greater detail in the following way of example only and with reference to the attached drawings, in which.

DETAILED DESCRIPTION

Figure 1:
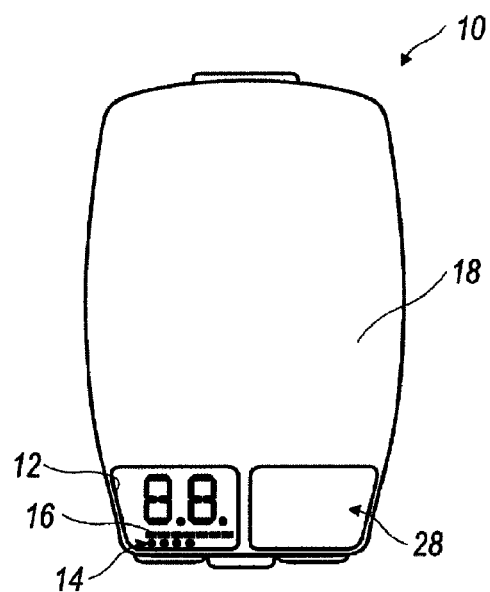
FIG. 1 is a plan view of a brake controller according to the present disclosure showing an information display and indicator lights on a portion of the cover of the device.

The brake controller in accordance with the present disclosure can be of the proportional brake control type applied to electric brakes of a towed vehicle, such as a trailer, wherein the controller includes a sensor, such as an accelerometer, reactive to a braking force applied by the driver of the towing vehicle. When detecting a change in braking, the sensor sends a signal proportional to the braking force. A microprocessor acts in response to the signal to determine output settings used by the brake controller to activate the towed equipment braking system for application of sufficient braking force for desired slowing of the towed equipment in concert with the towing vehicle. The term towed equipment includes a towed vehicle which in one embodiment is a trailer. While the brake controller as described herein can also be described as a brake control unit or a wireless brake control system.

The brake controller can use a dual axes accelerometer to sense varying road conditions, changes in terrain and braking situations. Whenever the towing vehicle brakes are applied, the sensing means of the brake controller reacts to the rate of vehicle deceleration and applies a proportional amount of brake power to the towed equipment for a smooth seamless stop. During operation the brake controller is fully adjustable, yet requires no manual leveling. However, in at least one embodiment the brake controller may require an initial calibration to implement the leveling feature. The brake controller includes automatic leveling sensors that continually monitor their surroundings. An easy-to-read display informs the driver of the power applied to the trailer brakes and the conditions of a range of diagnostic functions. Further features of the brake controller include self-diagnostics providing feedback of the attitude and orientation of the towed equipment, manual override of the controller, if needed, operation that does not conflict with the towing vehicle's anti-lock braking system, cruise control or other electrical systems and accommodation of towed equipment with at least two braked wheels.

In other embodiments, the brake controller is a time-based controller which utilizes a power curve to adjust the braking of the towed vehicle. The time based controller applies the brakes of the towed vehicle uniformly regardless of incline, traction conditions, deceleration, or other factors relating to the surroundings of the towing and towed vehicles. These controllers are easy to install and provide consistent braking performance.

The brake controller is of convenient small size for secure mounting on a surface, such as above or below the instrument panel of the towing vehicle with ready driver access. The device display panel preferably of the light emitting diode (LED) or liquid crystal display (LCD) type provides information and includes a variety of display elements to indicate the activity of the brake controller. Alphanumeric information provided by the display includes indication of manual application of the brakes and a load range selection depending on the weight of the equipment under tow. Alternatively, when the brake controller is equipped with wireless transmitters and optionally wireless receivers, the brake controller can be made in the form of a key fob, much like that of a car remote. In one embodiment, the brake controller is sized such that it is less than 70 millimeters wide by 70 millimeters long on its front face. In at least one embodiment the brake controller is sized such that it is approximately 30 millimeters wide by 30 millimeters long on its front face.

Optional features of a brake controller include various language displays, unit size variation, suitable mounting structures including brackets, posts and the like. One embodiment of the brake controller uses close proximity wireless protocols for signal transmission between the controller and the braking system of the towed equipment and separation of control of left and right sides of the braking system of the towed equipment for better braking effect during a change of attitude or orientation of the towed equipment.

Another embodiment of the brake controller uses tactile controls to facilitate manual adjustment of the brake controller allowing the towing vehicle operator to select appropriate output settings for preferred handling of the combination of towing and towed equipment. The tactile controls take the form of buttons or a touch pad or the like. These controls may be used to preset output settings for the brake controller by adjusting the amount of brake force to be applied to the wheels of the towed equipment.

Installation of trailer brake controllers typically requires wiring for electrical connection to the power source of the towing vehicle, to the brake lights of the towing vehicle and to the brakes of the towed trailer or vehicle. An embodiment of the brake controller using wired systems has additional wires to further structure the brakes of the towed vehicle for independent operation of the left-side brakes from the right-side brakes. Also, in at least one embodiment the braking systems can have no direct electrical wiring connection from the towing vehicle to the towed equipment. Under these circumstances the towed equipment brakes operate in response to a wireless signal transmitted from the brake controller in the towing vehicle passenger compartment. It is also possible to provide independent operation of the left-side brakes from the right-side brakes using selected wireless signals specific to the desired brake set. Furthermore, the wireless transmission system can provide individual signals to control each wheel or pair of wheels.

Close proximity wireless protocols make signal transmission possible between the controller and the braking system of towed equipment. An example of a suitable close proximity wireless system is the increasingly popular Bluetooth® wireless technology. This technology allows short range communications without the use of cables to connect portable or fixed devices communicating at distances between 3 feet and 300 feet.

The use of Bluetooth® wireless technology also allows use of a portable transmitter that offers remote control or testing of towed equipment brake systems. This allows the driver to check operation of the towed vehicle braking systems before operating the towing vehicle.

The beneficial effects described above apply generally to the exemplary devices and mechanisms disclosed herein of the brake controllers. The specific structures through which these benefits are delivered will be described in detail hereinbelow.

While detailed embodiments are disclosed herein, it is to be understood that the disclosed embodiments are merely exemplary. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art.

Referring to the figures, wherein like numbers refer to like parts throughout the several views, FIG. 1 shows a plan view of a brake controller 10 showing an information display 12, indicator lights 14 and a gradient scale 16 on a portion of the housing 18 of the brake controller 10. The brake controller 10 also referred to herein as a trailer brake control, wireless brake control system, or brake control unit, is of convenient small size for secure mounting on a surface, such as above or below the instrument panel of the towing vehicle with ready access by the driver of the towing vehicle. Additionally, the brake controller 10 can be sized as described above and mounted remotely. For instance it could be mounted on the top of the dashboard of the towed vehicle, on the front of the dashboard, or even held by the operator of the vehicle. In the last embodiment, the brake controller 10 could be used from outside the vehicle.

Within the range of view of the driver, the display panel 12 provides information according to the condition and weight of the towed equipment. The display 12 can be of the light emitting diode (LED) type or liquid crystal type (LCD) including driver color selection and a variety of display elements depending on the activity of the brake controller 10. For instance, in the power conservation mode, without movement of the towed equipment for an extended period of time, the display 12 is essentially a blank screen. In the operating mode of the brake controller 10 a display 12, with only one of the indicator lights 14 illuminated, informs the driver that there is no equipment in tow. Illumination of more than one of the indicator lights provides additional information that might confirm that the unit is receiving power and a towed trailer, vehicle or other equipment is attached to the towing vehicle, for instance. Alphanumeric information provided by the display 12 includes indication of manual application of the brakes and a load range selection depending on the weight of the equipment under tow or driver preference for the handling of the combination of towing vehicle and towed equipment. The use of braking presets based on weight takes into account whether the towed equipment weighs less than the towing vehicle, is approximately the same weight as the towing vehicle or weighs more than the towing vehicle.

Other features of a brake controller 10 according to the present disclosure include optional language displays, unit size variation, suitable mounting structures including brackets, posts and the like, the use of close proximity wireless protocols for signal transmission between the controller 10 and the braking system of the towed vehicle and separation of control of left and right sides of the braking system of the towed equipment for better braking effect during a change of attitude or orientation of the towed equipment.

Figure 2:
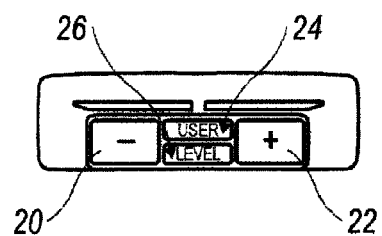
FIG. 2 provides an end view showing tactile controls for manual adjustment of the brake controller according to the present disclosure.
Figure 3:
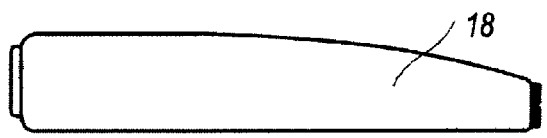
FIG. 3 is a side elevation view showing the profile of the brake controller according to the present disclosure.

FIG. 2 illustrates an end view of the brake controller 10 and FIG. 3 illustrates a side profile view of the brake controller showing the configuration of the housing 18 of the controller 10. As shown in FIG. 2, tactile controls 20, 22 for manual adjustment of the brake controller 10 that allow the towing vehicle operator to select appropriate output settings for preferred handling of the combination of towing and towed equipment are provided on a face of the housing 18. The tactile controls take the form of buttons or a touch pad or the like that provide a decreasing tactile control 20 and an increasing tactile control 22 for reducing or increasing output settings respectively. As illustrated in FIG. 2, the tactile controls 20, 22 include a button with a minus sign designating the decreasing control 20 and a button with a plus sign for the increasing control 22. It will be appreciated that tactile controls 20, 22 of different design may be used to select output settings for the brake controller 10. Output settings provide adjustment of the amount of brake force applied to the wheels of the towed equipment. The required brake force and output settings are greater for heavier items of towed equipment. In at least one embodiment, the adjustment using these tactile controls 20, 22 can also be described as adjusting the gain applied to the brake signals generated by the brake controller 10. When the gain is increased, a larger force is asserted by the brakes. Furthermore, the brake controller 10 can be equipped with a button 24 to select a predefined user profile and a button 26 to change the level of the braking force to be applied. The predefined user profiles enable a user to store preferences in regards to the amount of braking force to be applied by the towed vehicle brakes in response to a braking command from the brake controller 10.

Additionally, the brake controller 10 can be equipped with a manual activation feature such that the brakes of the towed equipment can be activated independently of the activation of the brakes of the towing vehicle. As shown in FIG. 1, a touch sensitive surface 28 located on the right side of the brake controller 10 provides an example of a possible implementation of a user control for the manual activation of the towed vehicle. Other user controls include a slide lever, radial dial, or push button. The touch sensitive surface 28 can be a touch pad surface or another surface that responds to touch engagement by the user. In at least one embodiment, the touch sensitive surface 28 sends a signal to the microprocessor which then sends a signal to activate the brakes of the trailer upon sensing the press-engagement of the touch sensitive surface. Furthermore, in another embodiment the touch sensitive surface 28 can generate a signal response to a degree of force that is exerted on the touch sensitive surface 28. The microprocessor of the brake controller can be programmed to receive a signal from the touch sensitive surface 28 indicative of a degree of force associated with the sensed press-engagement of the touch sensitive surface 28. Additionally, the microprocessor can output a signal to the brakes of the trailer in proportion to the degree of force sensed by the touch sensitive surface 28.

When the brake controller 10 is of the proportional brake control type applied to electric brakes of towed vehicle, such as a trailer, wherein the controller 10 includes at least one characteristic sensor, for example an accelerometer, reactive to a braking force applied by the driver of the towing vehicle. When detecting a change in braking, the at least one characteristic sensor sends a signal proportional to the braking force. A microprocessor acts upon the signal to adjust preset output settings used by the brake controller to activate the towed equipment braking system. The resulting braking force, corresponding to the signal transmitted by the at least one characteristic sensor, causes slowing of the towed vehicle at a desired rate in concert with the towing vehicle. It is conceivable to include the at least one characteristic sensor on the towed equipment where changes in speed, attitude and orientation cause changes in the condition of the at least one characteristic sensor. Sensed changes could lead to brake application if analysis by the microprocessor indicates that a problem has occurred with the towed equipment.

In other embodiments, the present disclosure is directed to a time-based brake controller which utilizes a power curve to adjust the braking of the towed vehicle. The time based controller applies the brakes of the towed vehicle uniformly regardless of incline, traction conditions, deceleration, or other factors relating to the surroundings of the towing and towed vehicles.

Installation of trailer brake controllers typically requires wiring for electrical connection to the power source of the towing vehicle, to the brake lights of the towing vehicle and to the brakes of the towed trailer or vehicle. Wired systems in accordance with the present disclosure include additional wires to further structure the brakes of the towed vehicle for independent operation of the left-side brakes from the right-side brakes.

The wires connecting the brake controller 10 to the vehicle wiring system can be structured such that wires from the brake controller 10 are directly wired to the circuit board of the brake controller 10. Alternatively, the brake controller 10 can be outfitted with a connector on a side of the controller 10, preferably the rear side, to facilitate connecting the controller 10 with the vehicle's wiring harness. This connector can facilitate moving the brake controller 10 between vehicles by simply connecting it to an existing wiring harness with the appropriate connector. Furthermore, when the brake controller 10 is equipped with a wireless transmitter as described below, it is possible to conceal the brake controller 10. This allows the brake controller 10 to be placed in a position to prevent damage to the controller 10 or occupants of the towing vehicle from the positioning of the brake controller 10.

It is also possible according to the present disclosure to provide braking systems associated with the towed equipment that have no direct electrical wiring connection from the towing vehicle to the towed vehicle. Under these circumstances the towed vehicle brakes are powered separately for activation by a wireless signal transmitted from the brake controller 10 in the towing vehicle cab. With the physical separation of towing vehicle braking system and towed vehicle braking system as indicated, it is also possible to provide independent operation of the left-side brakes from the right-side brakes using selected wireless signals specific to the brake set, left or right, to be activated.

As indicated previously, improvements of the operation of brakes of towed equipment and selection of specific brake sets for better control of the towed equipment is made possible by the use of close proximity wireless protocols for signal transmission between the controller 10 and the braking system of the towed equipment. An example of a suitable close proximity wireless system is the increasingly popular Bluetooth® wireless technology. This technology allows short range communications without the use of cables to connect portable or fixed devices. Bluetooth® wireless communications are secure offering several operating ranges from Class 3 devices with a range of about 3 feet, Class 2 devices having a range of about 30 feet and Class 1 devices with communications capability up to 300 feet.

The use of Bluetooth® wireless technology not only facilitates signal transmission between the towing vehicle and the towed vehicle via the brake controller 10, but adds the flexibility of a portable transmitter, the size of a key fob for example, that offers remote control or testing of towed equipment brake systems from outside of the towing vehicle. This allows the driver to check operation of the towed vehicle braking systems before operating the towing vehicle. The portable transmitter can also be equipped with a display similar to the information display 12 shown on brake controller 10 in FIG. 1. This portable transmitter could be configured to allow the user to adjust the settings of the controller 10 as described above.

While an example of a possible wireless communication system incorporates the BLUETOOTH® communication protocol as described above, other wireless communication protocols are considered within the scope of this disclosure. For instance, the wireless communication system can be any wireless communication system in which a wireless transmitter and wireless receiver can be paired such that only signals from the paired wireless transmitter are received by the wireless receiver. Additionally, in at least one embodiment, the wireless communication system is one that is a short range system, such that the transmitter is a short range wireless transmitter.

Figure 7:
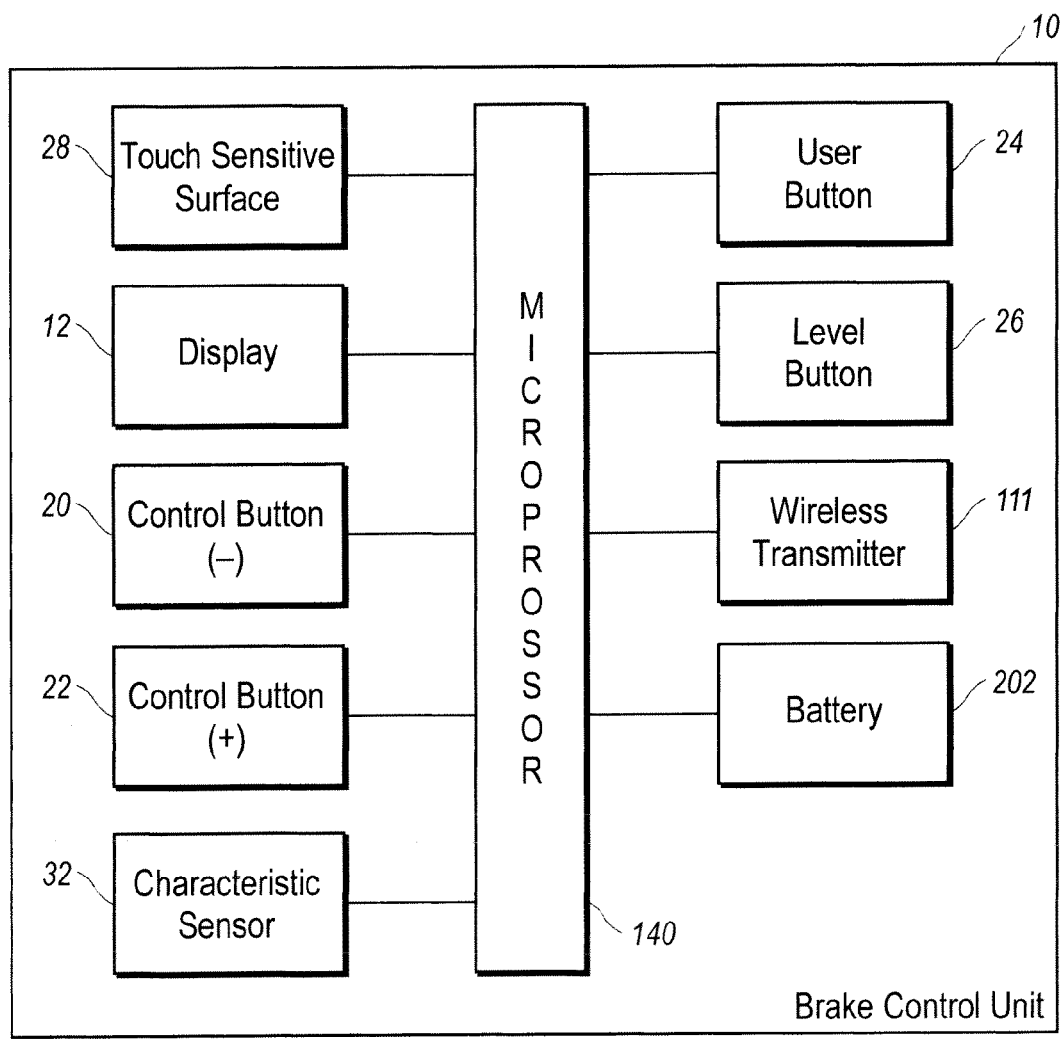
FIG. 7 is a block diagram illustrating the connections of various components within the brake controller.

An exemplary block diagram of the brake controller 10 is illustrated in FIG. 7. As illustrated the brake control unit can include a touch sensitive surface 28 that is communicatively connected with a microprocessor 140. This touch sensitive surface can be configured such that it is in signal communication with the microprocessor 140 and the microprocessor 140 sends a signal to activate brakes of the towed vehicle upon sensing press-engagement of the touch sensitive surface 28. Other functionality of the touch sensitive surface has been described above. Additionally, the microprocessor is in signal communication with the display 12, control buttons 20, 22, a user program button 24, a level button 26. In at least one embodiment, the brake control unit 10 is provided with a characteristic sensor 32 that senses the braking characteristics of the towing vehicle and/or the towed vehicle. The at least one characteristic sensor 32 can comprise at least one accelerometer and the at least one accelerometer can be located within the housing 18 of the brake controller 18. In another embodiment, the at least one characteristic sensor 32 comprises at least two accelerometers, and the at least two accelerometers are located with the housing 18 of the brake controller 10.

In at least one embodiment, the brake control unit includes a wireless transmitter 111. Additionally, in one embodiment, the brake control unit includes a battery 202 that can be used to provide power to the brake control unit 10 and can be communicatively coupled to the microprocessor 140. While these components are illustrated in associated with the brake control unit 10, other brake control units 10 that are within the scope of this disclosure may have more or less of the components as illustrated in FIG. 7. Additionally, certain other components may be required in order to allow for the unit to fully operate. For example, a display circuit may need to be provided to properly allow the display 12 to display information.

Figure 4:
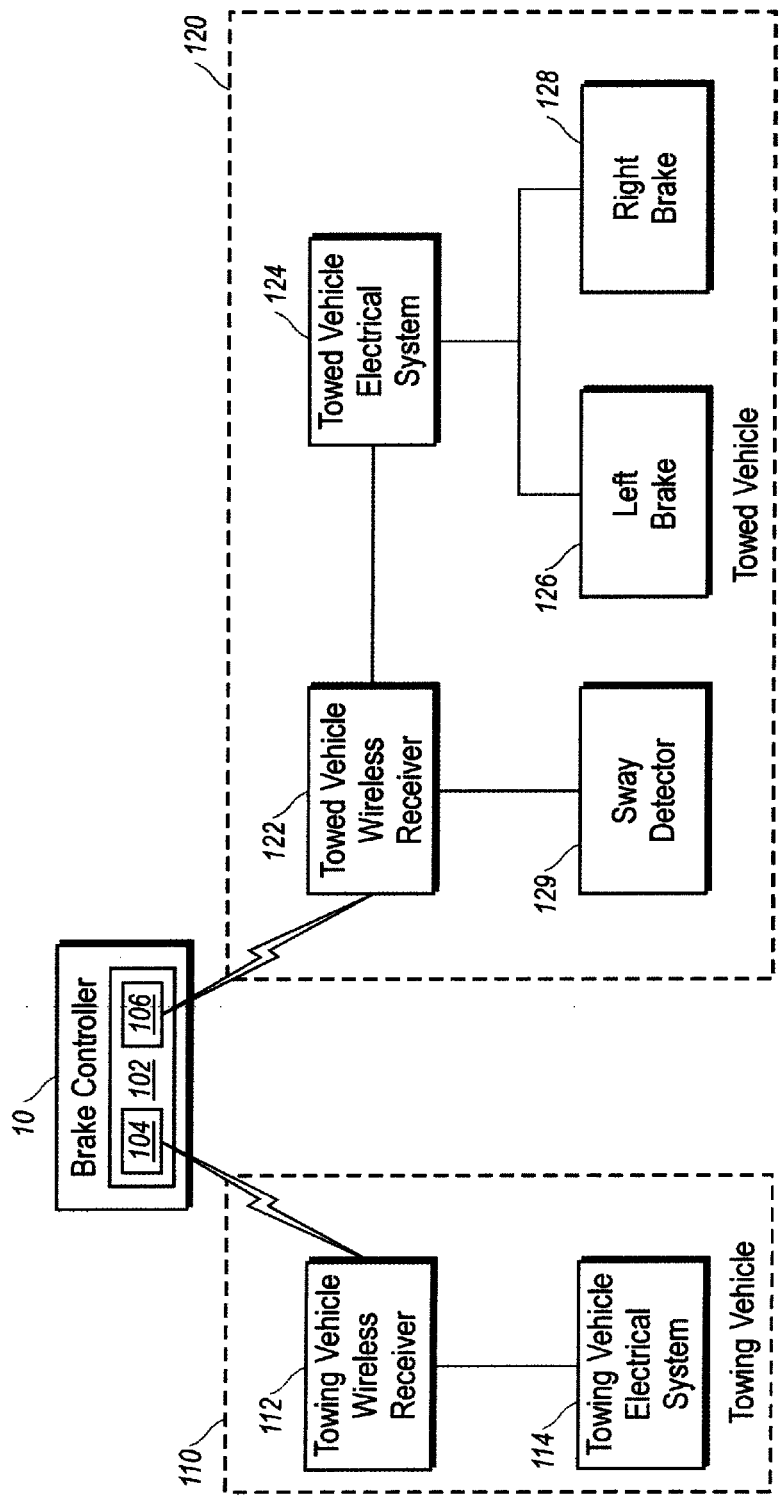
FIG. 4 is block diagram illustrating one embodiment of the brake controller and its interaction with towing vehicle's electrical system and towed vehicle.

An exemplary block diagram of a wireless brake control system is presented in FIG. 4. The brake controller 10 includes a microprocessor, at least one characteristic sensor, and a wireless transmitter. These will be described more fully in relation to FIG. 7 presented below. For clarity, in FIG. 4 only the wireless transmitter and/or receiver 102 is illustrated as being included within the brake controller. As illustrated the wireless transmitter has a wireless receiver module 104 for receiving information from the towing vehicle wireless transmitter 112. The towing vehicle wireless transmitter is electrically connected to the towing vehicle electrical system 114 and is located within the towing vehicle 110. While in the illustrated embodiment, a towing vehicle wireless transmitter 112 is provided, in other embodiments the towing vehicle wireless transmitter 112 could be a towing vehicle wireless receiver or a combination towing vehicle wireless transmitter and receiver. Likewise the first wireless receiver module 104 can be a wireless transmitter module or it can be a combination wireless transmitter and receiver module. Furthermore, while shown as a separate module, the wireless receiver module 104 could be combined into a single module 102.

Likewise, the brake controller 10 includes a wireless transmitter module 106 for transmitting a towed braking command signal to a wireless receiver 122 electrically connected to a wiring system on the trailer 124. The signals received by the towed vehicle wireless receiver 122 is configured to receive the towed braking command signal which is utilized to control a communicatively coupled towed braking system. As illustrated in FIG. 4, a left brake 126 and right brake 128 are illustrated as being communicatively coupled to the towed vehicle wireless receiver via the towed vehicle electrical system 124.

Additionally, a sway detector 129 can be mounted on the towed vehicle 120. The sway detector 129 can be configured to detect a sway condition of the towed vehicle 120. The sway detector 129 can include a sensor that detects motion of the towed vehicle 120 indicative of a sway condition. For example, the sway detector can include accelerometers capable of detecting changes in acceleration. When the accelerometers detect that a sway condition exists, a signal can be output from the sway detector and transmitted to the brake controller wirelessly via the towed vehicle wireless receiver, if equipped with a transmitter.

The towed vehicle can include brakes 126, 128 that can be controlled together or separately from each other. For example, the brake controller 10 can transmit a signal to the towed vehicle wireless receiver 122 to activate only the left brake 126. Alternatively, the brake controller 10 can transmit a signal to the towed vehicle wireless receiver 122 to activate only the right brake 128. This ability to independently control the left and right brakes enables the controller to control the towed vehicle when a sway condition has been detected.

When the microprocessor of the brake controller receives signals from at least one trailer sway sensor indicative of a trailer sway condition, it can transmit signals to the towed vehicle wireless receiver for modifying the braking characteristics of the towed vehicle. For example, the microprocessor can transmit pulse signals to the left-side brake 126 and the right-side brake 128 so that the left-side brake 126 and the right-side brake 128 of the towed vehicle are pulsed. In another embodiment, the microprocessor transmits pulse signals to the left-side brake 126 so that the left-side brake 126 of the towed vehicle 120 is pulsed. In yet another embodiment, the microprocessor transmits pulse signals to the right-side brake 128 so that the right-side brake 128 of the towed vehicle 120 is pulsed. In still another embodiment, the wireless brake controller transmits signals to a left-side brake 126 and a right-side brake 128 of the trailer such that the left-side brake 126 engages at a force greater than the right-side brake 128. In still another embodiment, the wireless brake controller transmits signals to a left-side brake 126 and a right-side brake 128 of the trailer such that the right-side brake 128 engages at a force greater than the left-side brake 126.

Figure 5:
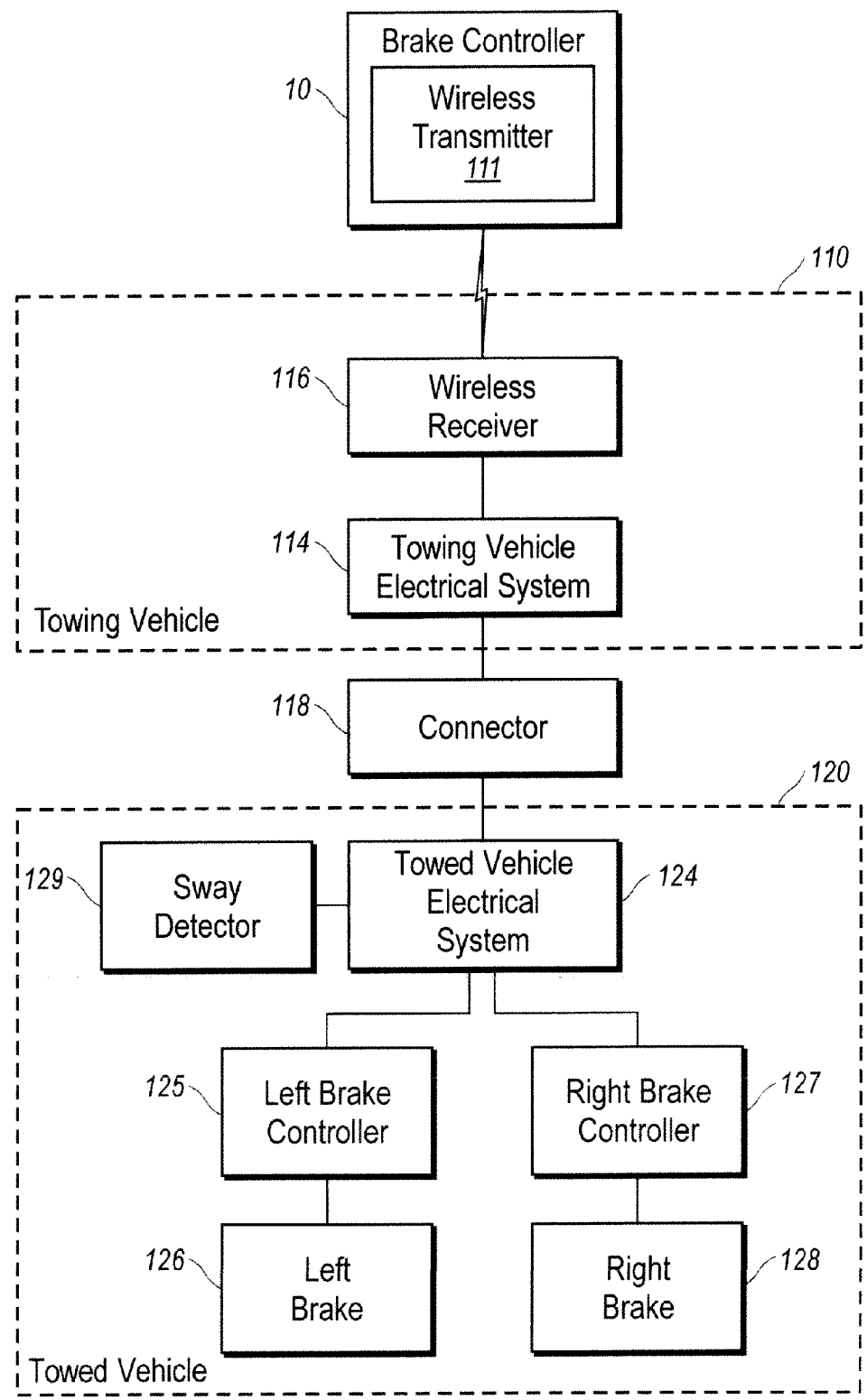
FIG. 5 is block diagram illustrating another embodiment of the brake controller and its communication with the electrical systems of the towing and towed vehicle.

Another embodiment of the brake controller 10 is exemplary shown via the block diagram of FIG. 5. The brake controller 10 is equipped with a wireless transmitter 111 that communicates with a wireless receiver 116 mounted within the towing vehicle 110. The wireless receiver 116 is electrically connected to the towing vehicle electrical wiring system 114. The towing vehicle electrical wiring system 114 has a connector 118 located on an exterior portion of the towing vehicle for connecting with a towed vehicle electrical wiring system 124. The connector 118 is shown outside of the towing vehicle 110. In other embodiments, the connector 118 may be located within the towing vehicle. Additionally while a wireless transmitter 11 and wireless receiver 116 are illustrated, the wireless transmitter 111 and wireless receiver 116 can also be transceivers capable of transmitting and receiving wireless communications.

The towed vehicle electrical system 124 includes a left-side brake controller 125 and a right-side brake controller 127 for adjusting the left-side brake 126 and right-side brake 128 respectively. The brakes are electric brakes in one embodiment. In another embodiment the brakes can be electric over hydraulic braking system. The other embodiments described herein can also include such braking systems.

The towed vehicle 120 can also have a sway detector 129 can be mounted thereon. The sway detector 129 can be configured as described above. When equipped with the sway detector 129, the wireless receiver should also include a transmit function and likewise the wireless transmitter 111 of the brake controller 10 needs to be capable of receiving the wireless signals. In other embodiments, separate components may be provided to allow for this functionality. Additionally, the connection can be through a wired connection as further discussed in relation to FIG. 6.

The towed vehicle of FIG. 5 can include brakes 126, 128 that can be controlled together or separately from each other. For example, the brake controller 10 can transmit a signal to the wireless receiver 116 to activate only the left-side brake 126. Alternatively, the brake controller 10 can transmit a signal to wireless receiver 116 to activate only the right-side brake 128. This ability to independently control the left-side and right-side brakes enables the controller to control the towed vehicle when a sway condition has been detected.

When the microprocessor of the brake controller receives signals from at least one trailer sway sensor indicative of a trailer sway condition, it can transmit signals to the towed vehicle wireless receiver for modifying the braking characteristics of the towed vehicle. For example, the microprocessor can transmit pulse signals to the left-side brake 126 and the right-side brake 128 so that the left-side brake 126 and the right-side brake 128 of the towed vehicle are pulsed. In another embodiment, the microprocessor transmits pulse signals to the left-side brake 126 so that the left-side brake 126 of the towed vehicle 120 is pulsed. In yet another embodiment, the microprocessor transmits pulse signals to the right-side brake 128 so that the right-side brake 128 of the towed vehicle 120 is pulsed. In still another embodiment, the brake controller 10 transmits signals to a left-side brake 126 and a right-side brake 128 of the trailer such that the left-side brake 126 engages at a force greater than the right-side brake 128. In still another embodiment, the brake controller 10 transmits signals to a left-side brake 126 and a right-side brake 128 of the trailer such that the right-side brake 128 engages at a force greater than the left-side brake 126.

Figure 6:
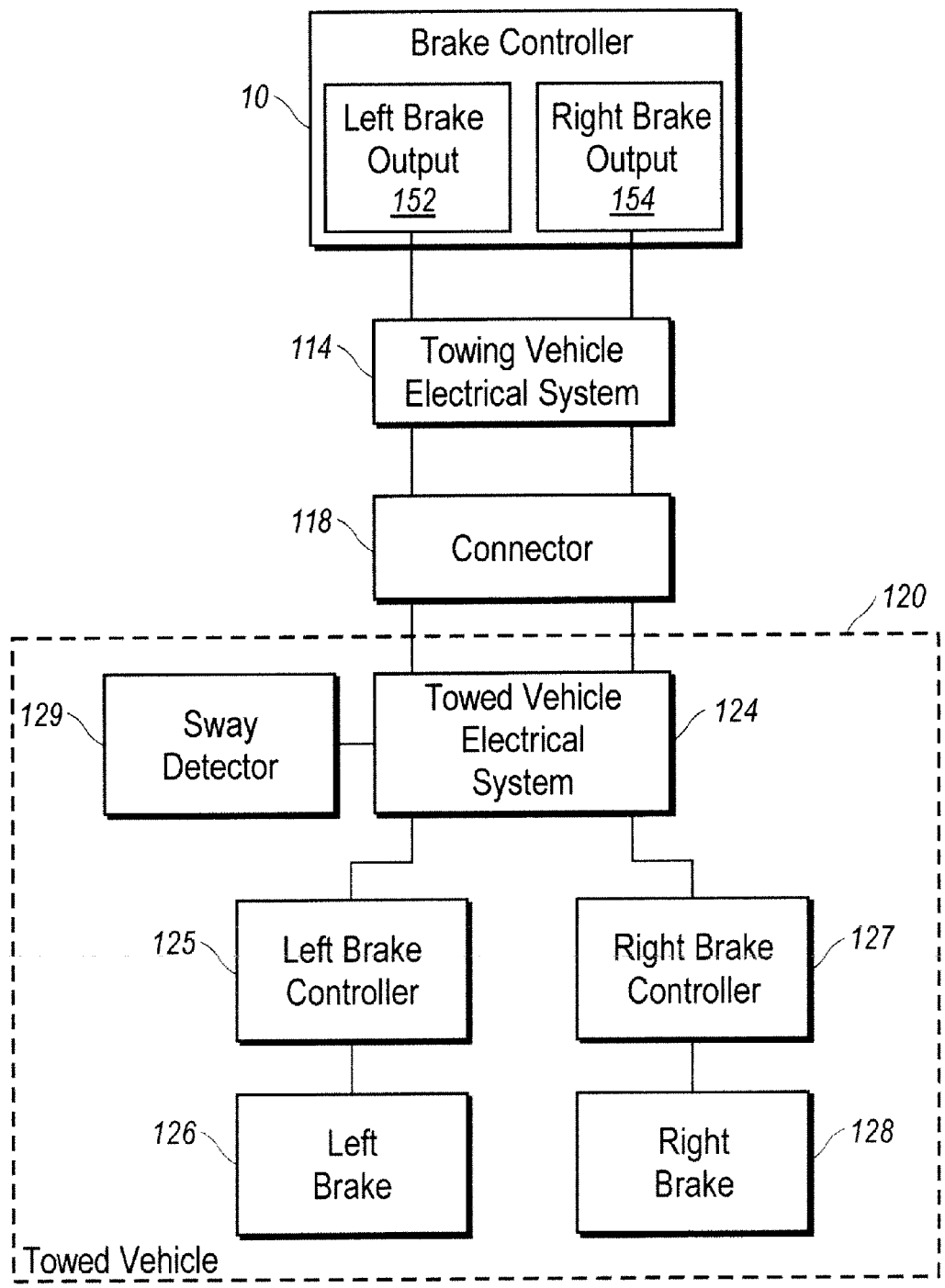
FIG. 6 is block diagram illustrating yet another embodiment of the brake controller and its communication with the electrical systems of the towing and towed vehicle.

In yet another embodiment illustrated in FIG. 6, the brake controller 10 includes a left-side brake output transmitter 152 and a right-side brake output transmitter 154. The left-side brake output transmitter 152 can be communicatively coupled to the microprocessor and configured to transmit a signal indicative of a programmed braking force for a brake 126 on a left side of the towed vehicle 120. Likewise, the right-side brake output transmitter 154 can be communicatively coupled to the microprocessor and configured to transmit a signal indicative of a programmed braking force for a brake 128 on a left side of the towed vehicle 120. This configuration allows the microprocessor to transmit signals via the left-side brake output transmitter 152 and right-side brake output transmitter to independently control the braking force applied by the brake on the respective side of the towed vehicle 120.

As illustrated in FIG. 6, a wired connection between the brake controller and the left-side brake 126 and right-side brake 128 is shown. Other configurations in which wireless transmitters are used are also considered within the scope of the disclosure as described above. When a sway condition is sensed by the sway detector 129, a signal is transmitted to the brake controller 10. Once the sway condition is determined, the brake controller 10 can transmit the appropriate signals to the left-side brake 126 and right-side brake 128. In one embodiment the microprocessor transmits pulse signals to the left-side brake output transmitter 152 and the right-side brake output transmitter 154. In another embodiment, the microprocessor of the brake controller 10 transmits pulse signals to the left-side brake output transmitter 152 so that a left-side brake 126 of the towed vehicle 120 is pulsed. In yet another embodiment, the microprocessor of the brake controller 10 transmits pulse signals to the right-side brake output transmitter 154 so that a right-side brake 128 of the towed vehicle 120 is pulsed.

Additionally, the brake control unit 10 can adjust the output signals via the left-side brake output transmitter 152 and right-side brake output transmitter 154 to control the left-side brake 126 and right-side brake 128 to reduce the detected trailer sway condition. For example, the brake control unit 10 can transmit signals to the left-side brake 126 and the right-side brake 128 such that the left-side brake 126 engages at a force greater than the right-side brake 128. Alternatively, the brake control unit 10 can transmit signals to the left-side brake 126 and the right-side brake 128 such that the right-side brake 128 engages at a force greater than the left-side brake 126. While in one embodiment, these signals are passed directly to the left-side and right-side brakes 126, 128, the illustrated embodiment encompasses the use of additional controllers for the brakes. Thus, a left-side brake controller 125 and right-side brake controller 127 are situated between the respective brakes and connector 118.

In other embodiments, a wireless transmitter and receiver can be implemented to bypass the towing vehicles electrical wiring system 114. In one embodiment, the wireless transmitter and receivers are configured to be connected to the individual brakes of the towed vehicle. While in another embodiment, the connector 118 of FIG. 6 can be replaced by a wireless transmitter and/or receiver. When so equipped, this enables the brake controller 10 to communicate directly with the towed vehicle 120 or the individual brakes 126, 128 or their respective controllers 125, 127.

In yet another embodiment, a brake control unit 10 for providing a brake output signal to a brake load of a towed vehicle 110 includes a first wireless communication module and a second wireless communication module. The first wireless communication module is communicatively coupled to the processor. Additionally, the first wireless communication module receives signals indicative of a vehicle braking condition from a remote braking sensor. The second wireless communication module communicatively can likewise be coupled to the processor, and the second wireless communication module transmits signals to a towed vehicle braking receiver which is electrically connected to brakes on the towed vehicle. Furthermore, a towed vehicle brake control module can be communicatively coupled to the processor. The towed vehicle brake control module selectively supplies signals to the second wireless communication module to engage said brakes on the towed vehicle.

While in still another embodiment, a method for controlling a brake load of a towed vehicle is disclosed. The method includes detecting a braking condition of a towing vehicle at a brake control module. In another step, the method generates a brake output signal for transmission to the towed vehicle from the brake control module. While in another step, the method transmits the brake output signal wirelessly from the brake control module to a towed vehicle communication module capable of receiving signals from the brake control module and transmitting signals to the towed vehicle.

In another embodiment, a brake control unit for providing a brake output signal to a brake load of a towed vehicle includes a brake control module coupled to a processor. The brake control module senses a braking condition of a towing vehicle and determines an appropriate braking command signal for transmission to the towed vehicle. Additionally, the brake control unit includes a wireless communication module coupled to the processor. The wireless communication module transmits braking command signals generated by the brake control module to a towed vehicle wireless module, which communicates the received signal to the towed vehicle.

While several exemplary embodiments have been described herein, it will be appreciated that various components of the individual embodiments can be combined with other embodiments to provide different systems. For example, the wireless communication can be performed between the wireless brake controller 10 and a transceiver associated with the towing vehicles electrical system 114, between the brake controller 10 and towed vehicles electrical system 124, or both the towing vehicle electrical system 114 and the towed vehicle electrical system 124. Additionally, as mentioned above, the wireless communication can be performed directly with the brakes 126, 18 of the towed vehicle 120.

A braking controller and its components have been described herein. These and other variations, which will be appreciated by those skilled in the art, are within the intended scope of this disclosure as claimed below. As previously stated, detailed embodiments of the present disclosure are disclosed herein; however, it is to be understood that the disclosed embodiments are merely exemplary of the disclosure that may be embodied in various forms.

What is claimed is:

1. A brake control unit for providing an output signal to brakes of a towed vehicle, comprising:

a characteristic sensor that detects a quantifiable braking-relevant characteristic of either the towing vehicle or the trailer and outputs data to a microprocessor of the brake control unit that represents the quantification of the detected braking-relevant characteristic;

said microprocessor programmed to receive and process the data representative of the detected braking-relevant characteristic and output corresponding data representing a trailer braking control command; and a housing within which said characteristic sensor and microprocessor are located and wherein said housing comprises a front face upon which a touch sensitive surface is located, said touch sensitive surface in signal communication with said microprocessor;

wherein said microprocessor sends a signal to activate brakes of the trailer upon sensing press-engagement of the touch sensitive surface;

wherein said microprocessor receives a signal from the touch sensitive surface indicative of a degree of force associated with the sensed press-engagement of the touch sensitive surface;

wherein said microprocessor outputs a signal to brakes of the trailer in proportion to the degree of force sensed by the touch sensitive surface.

2. A wireless brake control system for wireless communication of braking control commands between a towing vehicle and trailer, said system comprising:

at least one characteristic sensor that detects a quantifiable braking-relevant characteristic of either the towing vehicle or the trailer and outputs data to a microprocessor of the wireless brake control system that represents the quantification of the detected braking-relevant characteristic;

said microprocessor programmed to receive and process the data representative of the detected braking-relevant characteristic and output corresponding data representing a trailer braking control command;

a wireless transmitter communicatively coupled to the microprocessor and configured to receive the outputted data representing the trailer braking control command from the microprocessor and transmit a corresponding trailer braking command signal to a wireless receiver electrically connected to a wiring system on the trailer, said wireless receiver configured to receive the trailer braking command signal which is utilized to control a communicatively coupled trailer braking system;

a housing in which the characteristic sensor and microprocessor are housed; and a touch sensitive pad coupled to said microprocessor, wherein said microprocessor generates a trailer brake command in response to activation of the touch sensitive pad;

wherein said microprocessor receives a signal from the touch sensitive surface indicative of a degree of force associated with the sensed press-engagement of the touch sensitive surface;

wherein said microprocessor outputs a signal to brakes of the trailer in proportion to the degree of forces sensed by the touch sensitive surface;

wherein the touch sensitive pad is disposed with the housing.

3. The wireless brake control system as recited in claim 2, wherein said housing has a front face that is less than about 70 millimeters by 70 millimeters.

4. The wireless brake control system as recited in claim 2, wherein said microprocessor receives signals from at least one trailer sway sensor indicative of a trailer sway condition.

5. The wireless brake control system as recited in claim 4, wherein said microprocessor transmits pulse signals to the left-side brake controller so that a left-side brake of the trailer is pulsed.

6. The wireless brake control system as recited in claim 4, wherein said microprocessor transmits pulse signals to the right-side brake controller so that a right-side brake of the trailer is pulsed.

7. The wireless brake control system as recited in claim 4, wherein said microprocessor is further configured to adjust the trailer braking control signal to the left-side brake controller and right-side brake controller to control a left-side brake and a right-side brake of the trailer to reduce the detected trailer sway condition.

8. The wireless brake control system as recited in claim 4, wherein said wireless brake control transmits signals to a left-side brake and a right-side brake of the trailer such that the left-side brake engages at a force greater than the right-side brake.

9. The wireless brake control system as recited in claim 4, wherein said wireless brake control transmits signals to a left-side brake and a right-side brake of the trailer such that the right-side brake engages at a force greater than the left-side brake.

* * * * *